March 13, 1973   A. R. TILFORD ET AL   3,720,424

VACUUM SERVO VEHICLE LEVELING SYSTEM

Filed Dec. 23, 1971

INVENTORS
Albert R. Tilford,
Harold E. Boettger, &
BY Ming-Chih Yew

J.C. Evans
ATTORNEY

United States Patent Office 3,720,424
Patented Mar. 13, 1973

3,720,424
VACUUM SERVO VEHICLE LEVELING SYSTEM
Albert R. Tilford, Sterling Heights, Harold E. Boettger, Pontiac, and Ming-Chih Yew, Sterling Heights, Mich., assignors to General Motors Corporation, Detroit, Mich.
Filed Dec. 23, 1971, Ser. No. 211,365
Int. Cl. B60g 17/02
U.S. Cl. 280—124 F
5 Claims

ABSTRACT OF THE DISCLOSURE

A vehicle leveling system has a vacuum servo operated hydraulic height control valve for automatically leveling a vehicle. The valve fills and exhausts hydraulic leveler units from a central hydraulic system on the vehicle in response to vehicle load changes. Undamped height responsive air bleed valves are positioned by load changes to cause a pressure difference in opposed chambers of the vacuum servo both of which are bled down through a vehicle engine vacuum system.

---

Figure 1:
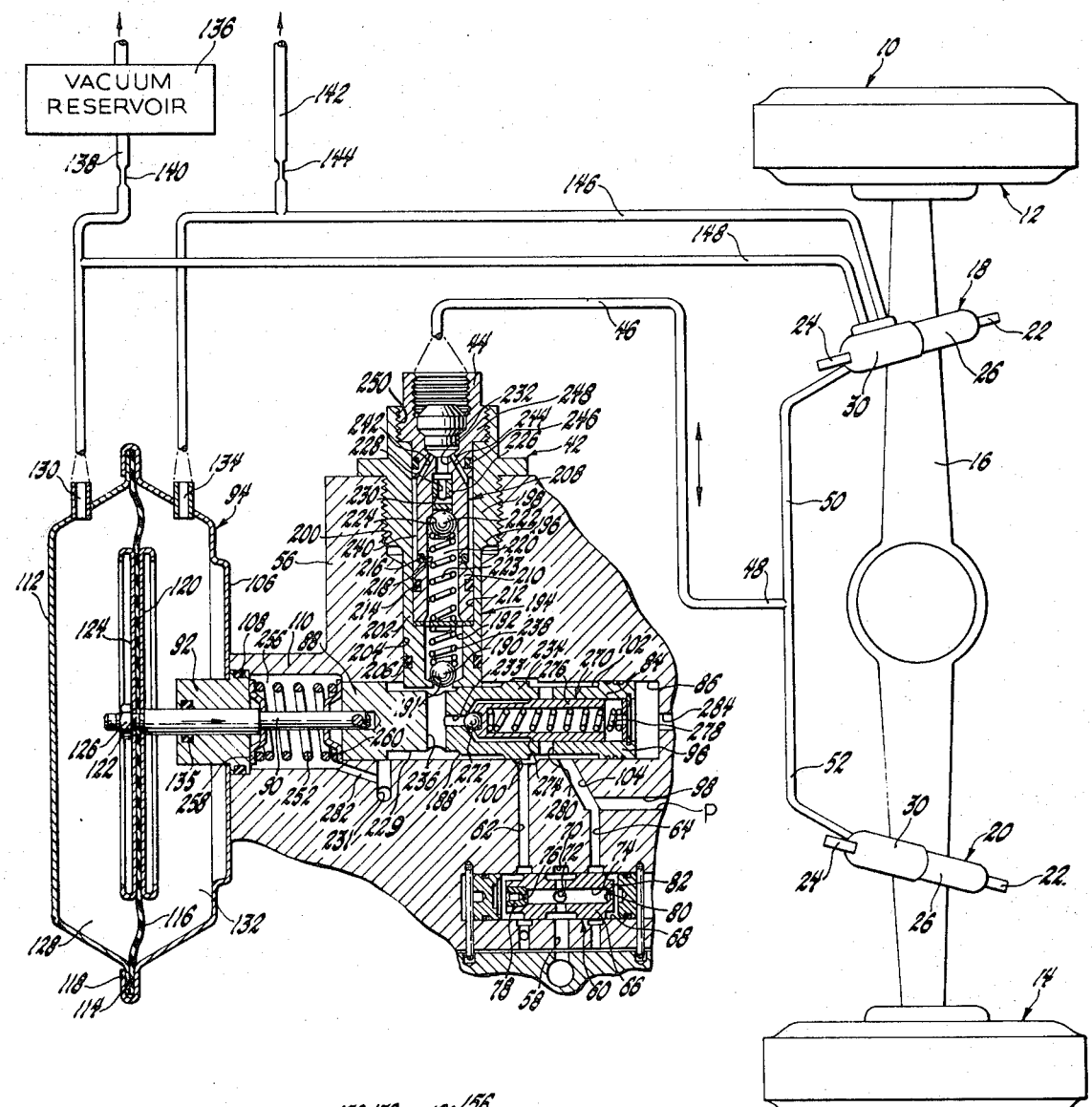

This invention relates to automatic vehicle leveling systems and more particularly to automatically controlled oil flow systems that direct oil to and from a variable volume chamber in a leveler unit located between the sprung and unsprung mass of the vehicle for maintaining a predetermined height relationship therebetween in accordance with the amount of oil present in the leveler unit.

In vehicle leveling systems it is desirable to include height control components that do not affect a change in the fluid condition within the leveler unit in response to ordinary road movements. In the past, damped, multi-position height control valves have been included in such circuits to isolate the leveler units from the remainder of the circuit during normal road movements.

Additionally, in many automatic leveling systems a separate pressure supply is required to change the fluid condition of the leveler units to increase their load carrying capacity. Alternatively, the leveler unit itself has included components responsive to normal road movements to vary fluid condition in the variable volume chamber portion of the leveler unit. These components are enclosed in the leveler units at a point difficult to service.

The present system utilizes an oil pump in an automatic vehicle transmission to supply a source of oil for use in leveler units of the type including a variable volume chamber and to which oil is either directed or exhausted for changing the height relationship between the sprung and unsprung mass of the vehicle. This fluid source eliminates the need for providing a separate pump or compressor on the vehicle and additionally, eliminates internally located self pumper components in a leveler unit.

The system also includes a controller which incorporates a vacuum servo actuator with first and second chambers therein connected to an existing vacuum source on the vehicle such as the intake manifold of an internal combustion engine for powering the vehicle. These connections will bleed down the chambers of the vacuum operator following a predetermined time delay as established by orifice control between the vacuum servo chambers and the vehicle vacuum source. The vacuum servo includes an actuator member selectively positioned upon a pressure differential occurring between opposite chambers therein to position a hydraulic spool valve in a null or neutral position during level vehicle operation. When the vehicle is loaded, the actuator member assumes a first control position wherein the oil pump of the transmission is connected by a height control valve to the leveler unit to increase the volume of oil therein to produce a greater uplifting force on the vehicle to return the vehicle to a desired height. When the vehicle is unloaded, the actuator will position the spool in a second operative position where the height control valve is conditioned to exhaust oil from the leveler unit back to the transmission sump to reduce the uplifting force and lower the vehicle to the desired height.

In order to condition the vacuum servo to locate the spool valve in its first and second control positions, an air bleed system is used. It includes a low cost, undamped valving component responsive to predetermined height relationships between the sprung and unsprung mass. The valving component is located in spaced relationship with the open end of two spaced apart air bleed lines each connected to one or the other of the opposed chambers of the vacuum servo. When the vehicle is level, the undamped valve will open and close each of the bleed lines an equal amount to bleed equal amounts of air into the opposed chambers of the vacuum actuator thereby to maintain a pressure balance across a diaphragm component thereof. This maintatins the spool valve in its null or neutral position. When the vehicle is loaded, the undamped valve will be moved against one of the open ends to cause a greater amount of air to bleed into one of the chambers of the vacuum actuator. An orifice controls exhaust of air from the other of the chambers back to the vacuum source for a predetermined time delay following which the vacuum servo chambers have a pressure differential therebetween to move the spool valve into its first control position to initiate a fill phase of operation. Conversely, when the vehicle is unloaded, the undamped valve will move into engagement with the open end of the other bleed line to direct more air into the other of the pressure chambers thereby to produce a reverse pressure differential across the diaphragm of the vacuum actuator to shift the spool valve into a control position where it will condition the height control valve to initiate an exhaust phase of operation wherein oil is directed from the leveler units back through the height control valve to the sump of the hydraulic transmission.

An object of the present invention is to utilize existing fluid systems in an internal combustion engine powered vehicle to supply pressure fluid to a vehicle leveler unit and to control the flow of pressurized fluid to the unit by pilot means powered by another available pressure source in the vehicle.

Still another object of the present invention is to use a central hydraulic source on a motor vehicle such as a pump component in an automatic hydraulic transmission to supply pressurized fluid to a vehicle leveler unit and to automatically control flow of pressurized fluid to and from the leveler unit by a servo control system operated by use of a vacuum source on an internal combustion engine for powering the vehicle and wherein a simple, undamped on-off vehicle height responsive valve is used to direct atmospheric air into the vacuum system to modulate the controlling action of the vacuum servo system.

Still another object of the present invention is to improve the automatic control of a hydraulic system supplying fluid to a variable volume chamber in a vehicle leveler unit by provision of a combination valve for regulating flow of oil from a central hydraulic pressure source on a vehicle to and from the vehicle leveler unit and to the transmission sump including a first spool valve component having a null position to isolate the leveler unit from the central hydraulic source, a first control position wherein the hydraulic source is communicated with the leveler unit to initiate a fill phase of operation and a second control position wherein the leveler unit is in communication with the sump of the central hydraulic system.

Yet another object of the present invention is to provide a system as set forth in the preceding object wherein the height control valve includes a high pressure inlet valve opened under pressure when the spool valve is in its fill position and opened by the shuttle valve itself when the spool valve is in its exhaust position, the valve further including a minimum pressure retention valve operative when the high pressure inlet valve is opened by the spool valve to define a return path for oil flow from the leveler units to the sump of the central hydraulic system and wherein the minimum pressure retention valve includes a movable flow attenuating element which evenly distributes return flow around a movable unitary check valve element to prevent noisy valve operation.

Still another object of the present invention is to improve automatic vehicle leveling systems of the type having an undamped height control valve for sensing height relationships between the sprung and unsprung mass of the vehicle for controlling exhaust flow to and from a variable volume chamber in a vehicle leveler unit by the provision of a vacuum servo actuator which operates a three-position height control valve wherein an undamped air bleed valve normally maintains a balanced pressure condition across the vacuum actuator and wherein loading or unloading of the vehicle will condition the undamped air bleed valve to produce a pressure differential in the vacuum actuator to initiate a fill or exhaust phase of operation and wherein an orifice is provided in a vacuum supply to the vacuum actuator and an orifice is in the air bleed supply, the orifices having a size ratio which will produce a quick return of the vacuum actuator to a balance pressure condition therein to prevent the leveler unit of a vehicle from overshooting or undershooting a desired predetermined height relationship between the sprung and unsprung mass of the vehicle.

Further objects and advantages of the present invention will be apparent from the following description, reference being had to the accompanying drawings wherein a preferred embodiment of the present invention is clearly shown.

Figure 2:
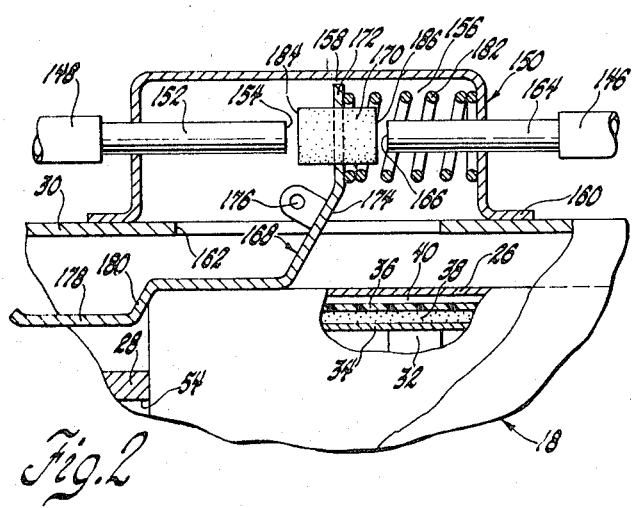

In the drawings:

FIG. 1 is a diagrammatic view of a vehicle leveling system in association with the vacuum servo operated height control valve of the present invention; and FIG. 2 is an enlarged, fragmentary view partially in section and partially in elevation of an undamped height sensor valve in the system of FIG. 1.

In FIG. 1, a vehicle leveling system is illustrated which shows a portion of a rear suspension 10 of a vehicle. It includes a pair of undamped ground engaging wheel assemblies 12, 14 each supported on either end of an axial housing 16.

The system further includes a pair of spaced apart vehicle leveler units 18, 20. Each of the leveler units has a bottom mount 22 connected to the axial housing 16 and an upper mount 24 which is adapted to be connected to a portion of the sprung chassis of a vehicle (not shown). Each of the leveler units 18, 20 function to produce a variable resultant uplifting force which will supplement the load carrying capacity of a pair of primary spring components (not shown) which are present in a vehicle suspension system to maintain a chassis in sprung relationship with respect to the unsprung mass portions as for example those portions represented by the axial housing 16 along with the ground engaging wheel assemblies 12, 14.

In the illustrated embodiment of the invention, each of the leveler units 18, 20, are representatively shown as high pressure vehicle shock absorbers, it being understood that any leveler unit having a variable volume chamber defined between two relatively movable members to produce vehicle leveling would be suitable for practicing the invention.

More particularly, each of the illustrated leveler units includes an outer reservoir cylinder 26 connected at the bottom end thereof to the bottom mount 22. A piston rod 28 extends from the reservoir cylinder 26. It is connected to an open ended dust shield member 30 in telescoping relationship to cylinder 26. Shield 30 has its upper end connected to the upper mount 24.

Normal road movements of the vehicle on the suspension springs thereof will cause the leveler units 18, 20 to extend and retract whereby the piston rod 28 will move into and out of the reservoir cylinder 26.

More particularly, the piston 28 is connected to a valved piston 32 slidably supported for reciprocation within an oil filled pressure cylinder 34. The pressure cylinder 34 is located in radially inwardly spaced relationship to the reservoir cylinder 26. A flexible tubular bladder 36 is located between the reservoir cylinder 26 and the pressure cylinder 34 as shown in the fragmentary view of FIG. 2 and is sealed to define a gas space 38 between the pressure cylinder 34 which is selectively pressurized during leveler unit operation. On the outside of the bladder 36 between it and the reservoir cylinder 36 is formed an oil reservoir chamber 40 which is in communication with the oil filled pressure cylinder 34. When oil is pumped into the leveler units 18, 20 the volume of oil in the chamber 40 will increase thereby to cause the bladder 36 to flex inwardly toward the pressure cylinder 34. This increases the pressure in the gas space 38.

The piston rod 28 is connected to the piston 32 to define a differential area thereacross. The increase in pressure in the gas space 38 will produce a resultant increase in pressure within the pressure cylinder 34. It acts across the differential area of the piston 32 and on the piston rod 28 to produce a variable resultant force between the end mounts 22, 24 to supplement the load carrying capacity of the primary springs of the suspension.

In accordance with certain principals of the present invention, oil flow to and from the variable volume oil filled reservoir chamber 40 is under the control of a height control valve assembly 42.

The height control valve assembly 42 more particularly includes a fitting 44 thereon connected to a conduit 46 for supplying oil through a tee connection 48 and branch lines 50, 52 serving as two way inlet and exhaust lines respectively to the leveler units 18, 20.

Each of the lines 50, 52 are connected to an inlet fitting which is connected to an axial passageway 54 through the piston rod 28 for supplying oil into the pressure cylinder 34 through base valve means (not shown) into the reservoir chamber 40.

The height control valve 42 has a housing 56 including an inlet passageway 58 adapted to be connected to a pump outlet in an automatic hydraulic transmission of a vehicle. Henceforth, this inlet passageway 58 will be referred to as a central hydraulic fluid source. The inlet passageway 58 is connected across a flow divider 60 to a leveler unit flow passageway 62 through which 10% of the flow from the inlet passageway 58 passes and to an auxiliary system's passageway 64 through which 90% of the flow from the passsageway 58 is directed.

More particularly, the flow divider 60 is in the form of a piston 66 slidably supported for reciprocation within a bore 68 having one end thereof in communication with the passageway 62 and the other end thereof in communication with the passageway 64. An annular opening 70 around piston 66 connects to passageway 58 and an opening 72 in the piston 66. The piston 66 includes a central bore 74 therethrough in communication with the inlet opening 72. At one end of the bore 74 an orifice 76 is located in an insert 78 and at the opposite end 82 thereof a second orifice 80 is located. The orifices 76, 80 have a flow area ratio to produce the 10% flow through passageway 62 and the 90% flow through the passageway 64.

In the illustrated arrangement, flow from the leveler unit passageway 62 is under the control of a spool valve 84 slidably supported for reciprocation in a housing bore 86.

One end portion 88 of the spool valve 84 is connected to one end of an actuator member 90 having the opposite end thereof slidably supported within a bearing element 92 for reciprocal movement into and out of a vacuum servo actuator 94.

The opposite end of the pilot valve 84 has a peripherally sealed land 96 slidably supported in the opposite end of bore 86.

As illustrated in FIG. 1, the vacuum actuator 94 is in a null or neutral position where it disconnects the passageway 62 from the bore 86. Oil flows through the 90% flow passageway 64 and thence through a passageway 98 leading to other hydraulic components such as the power steering hydraulic circuit of the car. When valve 84 is in its neutral position, the 10% flow through the passageway 62 will pass through an annular groove 100 in housing 56 and a groove 102 in the outer periphery of the valve 84. Groove 102 is in communication with a passageway 104 leading to the passageway 98.

During level phases of operation, wherein the valve 84 is maintained in its null or neutral position, the system is controlled to produce a balanced pressure condition within the actuator 94. To accomplish this, the actuator 94 has a first wall portion 106 fastened at a radially innermost portion thereof to the bearing element 92. The actuator is sealed with respect to element 92 by means of an O-ring 108 interposed between the element 92 and an extension 110 on the housing 56. The actuator includes a second wall portion 112 having a peripheral flange 114 thereon held in sealing engagement with the outer periphery of a flexible diaphragm 116. The sealing engagement is obtained in the illustrated embodiment by a bent over peripheral portion 118 on the first wall portion held against the flange 114 to press it in sealing engagement with the diaphragm 116.

The diaphragm 116 includes a reinforcing disc 120 on one face through which ar threaded extension 122 on the actuator member 90 extends to the opposite side of the diaphragm where it is secured against a like reinforcing disc 124 by means of a nut 126. The diaphragm 116 and wall portion 112 define a closed chamber 128 connected to a control conduit 130. An opposed chamber 132 is formed by the diaphragm 116 and the wall portion 106. It is connected by means of a conduit 134 in a fluid control ciricuit to be described.

In the illustrated arrangement the control chamber 132 is sealed with respect to the height control valve by an O-ring seal 135 supported within a groove on the inside of the bearing element 92 through which the actuator member 90 is reciprocated during system operation.

In accordance with certain principles of the present invention, the conduits 130, 134 are each connected to a source of vacuum, preferably, an existing vacuum source such as the intake manifold of an internal combustion engine for powering the vehicle. The conduit 130 through a conduit 138 having a vacuum bleed orifice 140 therein to vacuum reservoir 136 thence to engine vacuum. A conduit 142 and a vacuum bleed orifice 144 connects to the conduit 134.

The fluid control circuit further includes a first air bleed line 146 which is connected to the conduit 134. Line 146 along with the vacuum bleed orifice 144 establish the pressure within the chamber 132. A second air bleed line 148 is connected to the conduit 130 and with the vacuum bleed orifice 140 establishes the pressure level in height control chamber 128 of the actuator 94.

A height sensor assembly 150 is located on the leveler unit 18 to control the amount of air flow into the bleed lines 146, 148. More particularly, the assembly 150 includes a first tube 152 which is connected to the air bleed line 148. The tube 152 is an extension of the line 148 and it includes an open end 154 thereon located within a control chamber 156 formed by a housing member 158 with a peripheral segment 160 thereon connected to the dust shield 30 of the leveler unit 18 around an opening 162 therein.

The assembly 150 further includes a second tube member 164 connected to the air bleed line 146. It forms an extension of the conduit 146 and locates an open end 166 thereon also within the control chamber 156.

In accordance with certain other principles of the present invention, the fluid control circuit to the actuator 94 is under the control of an undamped valve assembly 168. It includes a movable valve element 170 supported on the distal end 172 of a sheet metal lever 174. It is pivotally connected by a pin 176 to the housing 158. The lever 174 also includes an end portion 178 located interiorly of the dust shield 30. It has an offset portion 180 therein which is maintained in spring biased engagement with the curved outer configuration of the shock absorber reservoir cylinder 26 by means of a spring member 182 having one end thereof engaged with housing 158 and the opposite end thereof biased against the lever arm 174 so as to cause the lever arm to be biased inwardly of the dust shield 30.

When the vehicle is level, the lever 174 is maintained against the cylinder 26 so that the movable valve element 170 will have opposite ends 184, 186 thereon located in spaced relationship to the open ends 154, 166 of the air bleed tubes.

When the vehicle is unloaded, the primary suspension springs will move the chassis frame upwardly from the axial housing 16 thereby to cause the leveling units 18, 20 to extend. At this point, the spring 182 will bias the lever 174 farther into the chamber opening 162 causing the end 184 on the movable element 170 to close against the open end 154 of the bleed tube 152 to close line 148.

When the valve 168 is so positioned, an exhaust phase of operation is initiated. During the exhaust phase, atmospheric air bleed through conduit 148 is blocked and air is withdrawn from the chamber 128 through conduit 130 across the orifice 140 and the conduit 138 to the vacuum source to reduce the pressure therein. Concurrently, atmospheric air is bled from the open end 166 and the bleed line 146 into the chamber 132 to increase the pressure therein. Accordingly, the diaphragm 116 will move to the left as viewed in FIG. 1 thereby to move the vacuum actuator member 90 to the left along with the spool valve 84. At this point, a tapered surface 188 on the shuttle piston 84 will move against a ball check valve 190 to move it upwardly from a valve seat 191 leading to an internal bore 192 of a high pressure inlet valve assembly 194.

The high pressure inlet valve 194 is located in one end of a tubular fitting 196 which has a threaded head portion 198 threadably received in an internally threaded bore 200 formed in the housing 56. It further includes a tubular extension 202 thereon slidably fit in a housing bore 204. The extension 202 is sealed with respect to the bore 204 by an annular O-ring 206 around the end thereof.

The high pressure valve 194 is opened by the pilot valve 84 and is in series communication with a low pressure exhaust valve assembly 208. Assembly 208 includes a tubular extension 210 slidably supported in a bore 212 of the fitting 196. It is sealed with respect to the bore at one end thereof by an O-ring 214. An annular valve member 216 is seated in a peripheral groove of extension to define a high pressure check valve.

The high pressure check valve is communicated by a plurality of circumferentially spaced openings 218 with an internal bore 220 through the low pressure exhaust valve assembly 208. Within this bore is located a low pressure spring biased against one side of a ball check element 222 maintained in sealed relationship with an annular seat 224.

Above the seat 224 is located a flow attenuating insert 226 having an axial passageway 228 therethrough in communication with a transverse passageway 230 therein.

The insert 228 is aligned with an exhaust port 232 formed in the fitting 44 to the conduit 46 leading to leveler units 18, 20.

Thus, in the exhaust phase of operation, high pressure oil within the reservoir 40 will flow through the branch lines 50, 52 and the conduit 46 and fitting 44 against the flow attenuating insert 226. The pressure of the oil will cause the insert 226 to move downwardly as viewed in FIG. 1 against the ball check element 222 to move it from its seat. At the same time oil will flow evenly around the side of the ball 222 to prevent impacting of the ball 222 against itsseat during the exhaust phase of operation thereby to reduce the noise of operation.

The valve 222 is thereby maintained against the light force of the spring 222 and exhaust oil flow will occur through the internal bore 220 around the open valve 190 thence to the hydraulic sump through a groove 229 in valve 84 and to low pressure opening 231 in housing 56.

As the high pressure oil flows from the leveling units 18, 20 during the exhaust phase, there will be a lesser resultant uplifting force therefrom. As a result the more lightly loaded chassis of the vehicle will move downwardly toward the axle housing 16 toward its desired height relationship. When this occurs, the undamped valve assembly 168 will be returned to the position shown in FIG. 2. At this point, normal road movements of the vehicle will cause the valving element 170 to have the opposite ends 134 and 186 thereon continually moved against and from the open ends 154, 166 of the bleed lines 146, 148. As a result, equal amounts of air will bleed into the chambers 128, 132 to cause a pressure balance to be produce therein. This causes the operator 94 to position the spool valve 84 in the illustrated null or neutral position.

When the vehicle is loaded the control arrangement will operate to initiate a fill phase of operation.

To accomplish this, the vehicle chassis is loaded to cause the primary springs to compress. This will cause the leveler units 18, 20 to retract. At this point the lever 174 will be moved by the outer surface of the shock absorber, namely the reservoir cylinder 26, to cause it to move outwardly or in a clockwise direction as viewed in FIG. 2. This will cause the end 186 of the valving element to close the open end 166 of the bleed conduit 146 and will concurrently space the end 184 of the valving element 170 from the open end 154 to the bleed conduit 148. As a result, air is bled through the conduit 148 into the chamber 128 while air is concurrently withdrawn from the chamber 132 through an exhaust path represented by the conduit 134, the vacuum orifice 144 and the conduit 142 to the engine intake manifold. As a result, a reverse pressure differential is produced across the diaphragm 116 as compared to the pressure differential which existed during the above-discussed exhaust phase of operation. This reverse pressure differential will cause the actuator arm 90 to move to the right as viewed in FIG. 1. It will cause an intermediate land portion 234 on the shuttle piston 84 to uncover the passageway 62 to communicate it with the bore 86. High pressure fluid will thence pass through a transverse bore 236 in the piston 84 where it will act on the ball check element 190 to raise it against the resistance of a spring 238 which establishes the relief point of the high pressure valve assembly 194.

When the element 190 lifts off its seat high pressure fluid will flow through the internal bore 220 thence will flow across the unidirectional, annular valving element 214 into an annular space 240 between the tubular extension 202 and the tubular extension 210 of the minimum pressure retention valve assembly 208. The high pressure flow then passes through inclined passageways 242, 244 to the fitting 44 which is connected to the conduit 46. The bore 240 is sealed with respect to the bore 212 by an O-ring 246 supported in the outer periphery of the fitting 44 at a point below a threaded head portion 248 thereon that is received by an internal threaded bore 250 on the upper end of the fitting 196.

Thus, during the fill phase of operation high pressure hydraulic fluid is directed through the conduit 46 and the branch lines 50, 52 interiorly of the leveler units 18, 20. This oil accumulates in the reservoir spaces 40 to compress the gas in the space 38 to increase the pressure level within the pressure cylinder 34. It acts on the differential area across piston 32 to produce increase in the uplifting force from the leveler units 18, 20. The additional uplifting force will raise the loaded vehicle back to a predetermined desired height relationship with the vehicle to restore the vehicle to a level phase of operation as described above.

During reciprocation of the spool valve 84 between its fill exhaust and low positions the end 88 of the shuttle piston 84 is spring biased by a spring member 252 located in a chamber 256 within housing extension 110. Each end of the spring 252 is in engagement with a spring locator member 258, 260. Each of the members 258, 260 has a small diameter portion of the actuator extending therethrough. During movement of the actuator 90 in a direction toward the fill position (toward the right in FIG. 1) the spring 252 is compressed. It will serve to quickly return the diaphragm 116 to its null position following a full phase of operation. Like spring compression occurs as actuator 90 moves in an opposite direction during the exhaust phase. This will result in an opposite quick return to a neutral position following exhaust.

In addition to the return action of the spring 252, in accordance with certain other principles of the present invention the actuator 94 and the fluid control circuit is arranged to assure that the height control valve 42 will be quickly positioned in the proper mode of operation following each leveling operation to correct for load change on the vehicle chassis. More particularly, the quick return aspect of the invention is due to the fact that the size of each of the open ends 154, 166 is approximately 25 times the flow area of the small diameter vacum bleed orifices 140, 144. Because of this large difference in flow area the amount of air flow into the control chambers 128, 132 of the actuator 94 is much greater than the draw down through the vacuum components. Thus, once the vehicle has been returned to its level position so that the undamped valve assembly 168 has its valving element 170 in spaced relationship to the open ends 154, 166 each side of the diaphragm 116 will be quickly returned to a balanced pressure condition thereby, along with the return action of the spring 252, to be operative to quickly return the spool valve 84 to its null position. This prevents the vehicle chassis from overshooting or undershooting a desired height relationship at the end of a fill or exhaust phase of operation.

Another aspect of the present invention is that the minimum pressure retention valve 208 prevents all oil being dumped from the reservoir chambers 40 during the exhaust phase of operation. The minimum pressure retention provided by the valve 208 is selected to maintain a level vehicle with two passengers in its front seat. One or both of these passengers can be removed from the vehicle, and without exhaust, the vehicle will be maintained level. When additional weight is added, the leveling system fill phase will occur in a manner to correct for subsequent pitch changes. In the illustrated arrangement, the leveler units 18, 20 use the leveling oil as a damping fluid for shock absorbing control. The additional oil charge provided by the minimum pressure retention valve 208 retains a given amount of oil in the reservoir space 40 which also provides for necessary rebound control across valving components of the type typically found in hydraulic shock absorbers.

Another desirable operational characteristic of the invention is that the system operation is delayed a period of from two to five seconds to prevent ordinary road movements from initiating either an exhaust or a fill control phase of operation during periods when the vehicle is leveled. In the illustrated arrangement this is accomplished by providing restrictions in the form of the vacuum bleed orifices 140, 144. The bleed down from one of the control chambers 128 or the other of the control chambers 132 is delayed by virtue of this restriction for the aforementioned time delay period to prevent undesirable or unnecessary vehicle leveling operation. This reduced restriction to the vacuum side of the fluid control system for the actuator 94 is also complemented by the undamped action of the valve assembly 168 which, as mentioned above, will continually move into and out of engagement with the open ends 154, 166 of the air bleed lines 146, 148 to evenly distribute bleed air into the chambers 128, 132 so as to maintain a balanced pressure condition therebetween. The vacuum reservoir 136 assures operation of vacuum actuator 94 when an exhaust phase occurs.

Yet another phase of the system operation occurs when the vehicle is overloaded. When this occurs, the system will continually direct pressure into the leveler units until a maximum pressure condition in the order of 1400 p.s.i. occurs in the bore 86. Under these conditions the central hydraulic pressure source may be subjected to a high pressure mode for an undesirable period of time. Accordingly, a pressure control valve 270 in valve 34 is operative to provide a high pressure blowoff capacity. First, a ball check element 272 opens to pressure a land 274 on a hollow piston element 276 to move it against the force of a relief valve spring 278. When the valve 272, which defines a first area, has been unseated, the area against which the pressure acts is extended by the outside diameter of land 274 of the piston. This acts to hold the valve 251 against pulsation. When the land 274 moves away from the port 280 in the pilot valve 84, high pressure fluid will return to the power steering circuit by the passageway 98. Oil from the central hydraulic source flows via passageway 62, passageway 236 and inlet 233 through valve 270 during the overload period. The valve 270 resets when load is removed from the vehicle and pressure on the area of land 274 is reduced to a point where the force of spring 278 overcomes the pressure force.

A bleed to transmission pump is provided by a housing bore 282 to return leakage into chamber 256 to the transmission sump. At the opposite end to valve 84 a bore 284 serves the same purpose. In one working embodiment of the invention the total oil capacity of each of the high pressure shock absorber leveler units 18, 20 is in the order of 20 cubic inches for each shock absorber. Preferably a central hydraulic system will have a total hydraulic capacity in the order of 28 quarts of fluid. In the same working embodiment of the invention the bladder 36 of the leveler units is made of a mixture of polyepichlorohydrin and polyepichlorohydrin ethylene oxide. This copolymer has a desirable flexibility to meet the requirement of the changes of volume of oil in the reservoir space 40 down to a temperature of −40° F. The polymer also has been found to have a very low permeability to diatomic gases such as $N_2$. In the working embodiment, a transmission pump of the vane type supplies the passageway 58. It has a capacity of three gallons per minute. Its flow is divided 10% for use in the leveling system and 90% for use in other auxiliary systems including the power steering of a vehicle and brake components.

While the embodiments of the present invention, as herein disclosed, constitute a preferred form, it is to be understood that other forms might be adopted.

What is claimed is as follows:

1. A vehicle leveling system comprising a leveler unit having variable volume chamber means therein for producing an uplifting force for maintaining a predetermined height between the sprung and unsprung mass of the vehicle, said variable volume chamber means having an inlet fitting to direct oil into and from said chamber means to vary the oil volume therein, a hydraulic supply, means including a height control valve for connecting said hydraulic supply to said variable volume chamber inlet fitting, a vacuum actuator having first and second chambers therein, a diaphragm separating said chambers including an actuator member thereon operable between first and second control positions, means for connecting each of said chambers to a vacuum source, means including an undamped valve responsive to height relationship between the sprung and unsprung mass of a vehicle for connecting one or the other of said first and second chambers to atmosphere in accordance with the height relationship between the sprung and unsprung mass of the vehicle to produce a pressure differential in said first and second chambers thereby to move said actuator member between its first and second controlled positions, said actuator member in its first position operating said height control valve to communicate said hydraulic supply with said variable volume chamber to increase the uplifting force of said leveler unit, said actuator member in its second position operating said height control valve to return oil from said leveler unit to the hydraulic supply for reducing the uplifting force between the sprung and unsprung mass for returning the vehicle to a level position when a load is removed therefrom, said undamped valve being operative in response to normal road movements to maintain substantially the same pressure within each of said first and second chambers to prevent operation of the said actuator in response to ordinary road movement, said undamped valve being operative when the vehicle is either loaded or unloaded to sense a height change between the sprung and unsprung mass portions thereof to direct a greater amount of air into one or the other of said first and second chambers to produce a pressure differential therebetween for moving said diaphragm from a neutral position only in response to changes in loading on the vehicle.

2. A vehicle leveling system comprising a leveler unit having a variable volume chamber therein for producing an uplifting force between the sprung and unsprung mass of a vehicle for maintaining a height relationship therebetween, said variable volume chamber having an inlet fitting, a hydraulic supply, means for connecting said hydraulic supply to said variable volume chamber including a height control valve, a vacuum actuator having first and second chambers therein, a diaphragm separating said chambers including an actuator member thereon, a first fluid supply conduit to said first chamber, a second fluid supply conduit to said second chamber, a first vacuum line connected to said first conduit for evacuating said first chamber, a first air bleed line connected to said first conduit including an open end in communication with atmosphere, a second vacuum line connected to said second conduit for evacuating said second chamber, a second air bleed line connected to said second conduit including an open end in communication with atmosphere, a movable valve element interposed between said open ends of said first and second air bleed lines, means adapted to be connected between the sprung and unsprung mass of the vehicle for positioning said movable valve element intermediate said open ends when the vehicle is at a predetermined height relationship to bleed equal amounts of air into said first and second chambers thereby to maintain a balanced pressure across said diaphragm and to maintain said actuator member in a neutral position, said valve element being positioned when the vehicle is unloaded to close one of said open ends and open the other of said open ends to bleed more air into one of said first and second chambers thereby to produce a first pressure differential thereacross to move said actuator member into a first control position, said actuator member when in the first control position operating said height control valve to communicate said pressure source with said leveler unit to produce an increase of lifting force therefrom, said movable valve element being positioned when the vehicle is unloaded to reverse the closure of said open ends to produce a reverse pressure differential across said diaphragm to move said actuator member into a second control position, said actuator arm in its second control position operating said height control valve to exhaust oil from said leveler unit to reduce the uplifting force therefrom, said movable valving element being continuously moved into an open and closed relationship with said open ends during normal vehicle road movement to bleed air equally into each of said first and second chambers to maintain a balanced pressure across said diaphragm during normal vehicle road movements whereby said actuator member is maintained in its neutral position, said actuator member when it its neutral position conditioning said height control valve to maintain a fixed amount of oil within said leveler unit thereby to prevent changes in the uplifting force in response to normal road movements of the vehicle.

3. A vehicle leveling system control for regulating flow of hydraulic oil from a pressure source to an oil outlet adapted to be connected to a variable volume chamber of a hydraulic leveler unit and to return oil from the leveler unit through a common line back to a hydraulic sump, comprising a valve housing having a first bore therein, a spool valve in said first bore, means including an intermediate land portion on said spool valve for slidably supporting said spool valve within said bore for opposite reciprocation therein, an actuator member connected to said spool valve, a vacuum actuator for operating said spool valve including a first chamber and a second chamber, a diaphragm separating said first and second chambers connected to said actuator member, a conduit connected to each of said chambers, means for connecting each of said conduits to a vacuum supply, means for selectively connecting each of said conduits to atmosphere for maintaining a predetermined pressure condition within said first and second chambers, a first flow passageway adapted to be connected to a source of oil pressure, said valve housing including a second flow passageway adapted to be connected to a hydraulic sump, a second bore in said valve intersecting said first bore, a high pressure inlet valve in said second bore including a movable portion thereon located in said first bore for engagement with said spool valve when said actuator member moves said spool valve into a first control position, a fluid fiitting in said second bore in communication with said high pressure inlet valve, check valve means between said high pressure inlet valve and said fitting, said fitting adapted to be connected to an oil chamber in a leveler unit for supplying oil to and receiving exhaust oil from the leveler unit, a minimum pressure retention valve located in said second bore for controlling exhaust flow from said fitting to said high pressure inlet valve during an exhaust phase of operation, said vacuum operator being maintained in a neutral position when pressures are balanced between said first and second chambers thereof, said spool valve blocking communication between said first passageway and second bore when the valve is in a neutral position to block oil flow either to or from said fluid fitting, said actuator member being positioned in a first control position when a first predetermined pressure differential occurs in the chambers of said vacuum actuator to cause said spool valve to be positioned to communicate said first passageway with said second bore, said high pressure inlet valve being operated by pressure from the pressure source to communicate the source with the leveler unit when the actuator member is in its first control position, said actuator member being operated to locate said spool valve in a second control position when a reverse pressure differential occurs between the first and second chambers of said vacuum actuator, said spool valve having a portion thereof in engagement with said movable portion of said high pressure inlet valve when in the second control position to open communication between the first and second bores, a land on said spool valve blocking communication between said first passageway and said first bore when in its second position, said minimum pressure retention valve being opened by pressure from said fluid fitting for reverse flow through said second bore and across said open high pressure inlet valve into said first bore, and means for communicating said first bore with said second passageway to the hydraulic sump to permit exhaust from the leveler units to the hydraulic sump when the actuator member is in its second control position.

4. A hydraulic height control valve for regulating oil flow to and from a leveler unit adapted to be connected between the sprung and unsprung mass of the vehicle for maintaining a predetermined height relationship therebetween and wherein the lever unit includes a variable volume oil filled chamber adapted to be connected to a single fitting for supply of oil to the leveler unit and for exhaust therefrom comprising; a valve housing having a bore, a high pressure inlet valve at one end on said bore including a valve seat and a movable valve element maintained normally closed against said valve seat, said movable valve element having a portion thereon extending beyond said seat, spring means for maintaining said valve element against said seat and responsive to pressure to direct oil into said bore, a minimum pressure retention valve in said bore having an inlet and an outlet in communication with said high pressure inlet valve, said minimum pressure retention valve including a seat and a valve element, spring means for maintaining said retention valve element in seated relationship with said valve seat, pressure flow through said high pressure inlet valve maintaining said minimum pressure retention valve closed, means defining a high pressure flow passageway in said valve in bypass relationship to said minimum pressure retention valve, a unidirectional check valve between said high pressure inlet valve and said bypass for permitting oil flow into said bypass passageway and to prevent reverse flow from said bypass passageway to said high pressure inlet valve, an oil fitting on said valve adapted to be connected to the oil chamber of a leveler unit, said fitting being in communication with said bypass passageway and the inlet to said minimum pressure retention valve, said movable valve element of said high pressure inlet valve adapted to be removed from said seat to permit reverse flow through said bore from said fitting through said minimum pressure retention valve and said high pressure valve during an exhaust phase of operation, said minimum pressure retention valve including a flow attenuating element with a passageway aligned with said bore and a second passageway arranged perpendicularly to the axis of said bore, said attenuating element being slidably supported in said minimum pressure retention valve and receiving oil from the leveler unit during an exhaust phase of operation to be shifted against the movable valve element of said minimum pressure retention valve to move it from its seat, oil flow from the leveler unit passing through said flow attenuating element first and second passageways to flow evenly on either side of said movable valving element of said minimum pressure retention valve to prevent it from vibrating open and closed during the exhaust phase of operation.

5. A vehicle leveling system adapted to be connected to a hydraulic pump in a vehicle transmission comprising a leveler unit connected between the sprung and unsprung mass of the vehicle having a variable volume oil chamber therein, a valve housing having a first bore therein, a second bore in said housing arranged in perpendicular intersecting relationship with said first bore, a first passageway in said valve housing adapted to be connected to a source of pressure, a second passageway in said valve housing adapted to be connected to a sump, a spool slidably supported in said first bore including a land portion thereon interposed between said first passageway and said first bore, valve means in said second bore including a high pressure valve responsive to oil pressure in said first bore to direct oil into the leveler unit and engaged by said spool to be positioned to permit exhaust flow of oil from the leveler unit through said second bore, means in said spool to communicate said first bore with said sump during the exhaust phase of operation, vacuum actuator means for positioning said spool to communicate the pressure source with the high pressure inlet valve during a fill phase of operation, to position said spool in engagement with said high pressure control valve during an exhaust phase of operation, and to locate said spool in a null position to block communication between said first passageway and said first bore and to move said spool out of engagement with said high pressure inlet valve thereby to maintain a predetermined amount of oil in the leveler unit when the vehicle is level, said actuator means having first and second control chambers therein, means for selectively evacuating opposite sides of the vacuum operator when the vehicle load is changed following a predetermined time delay to initiate either the exhaust or fill phase of operation, said means including conduit means and an orifice adapted to be connected to a vacuum source on the vehicle, means for maintaining a predetermined pressure balance in said vacuum actuator chambers during level vehicle operation including air conduits each having an open end and a movable, undamped valving element continuously moved against the open ends in response to ordinary road movements to bleed equal amounts of air into the first and second chambers of the vacuum actuator means to prevent operation of the spool during normal road movements, said movable undamped valving element being positioned when the vehicle load is changed to vary the amount of air flow into the chambers to initiate the time delayed period of vacuum exhaust of one or the other of the chambers to initiate either the exhaust or fill phase of leveling operation.

References Cited
UNITED STATES PATENTS 3,649,043  3/1972  Higginbotham _____ 267—65 C
3,116,918  1/1964  Francis _____ 267—65 C PHILIP GOODMAN, Primary Examiner U.S. Cl. X.R.

280—6 H; 267—65 C